(12) United States Patent
Gupta

(10) Patent No.: US 10,980,190 B2
(45) Date of Patent: Apr. 20, 2021

(54) ENVIRONMENT-CONTROLLED GREENHOUSE WITH COMPRESSOR AND BLOWER MODULES

(71) Applicant: Sat Parkash Gupta, Chandigarh (IN)

(72) Inventor: Sat Parkash Gupta, Chandigarh (IN)

( * ) Notice: Subject to any disclaimer, the term of this patent is extended or adjusted under 35 U.S.C. 154(b) by 0 days.

(21) Appl. No.: 15/844,354

(22) Filed: Dec. 15, 2017

(65) Prior Publication Data

US 2019/0021239 A1    Jan. 24, 2019

(30) Foreign Application Priority Data

Jul. 18, 2017  (IN) .............................. 201711025454

(51) Int. Cl.
| | | |
|---|---|---|
| *A01G 9/24* | (2006.01) | |
| *A01G 9/14* | (2006.01) | |
| *A01G 9/18* | (2006.01) | |
| A01G 9/20 | (2006.01) | |

(52) U.S. Cl.
CPC ........... *A01G 9/246* (2013.01); *A01G 9/1438* (2013.01); *A01G 9/18* (2013.01); *A01G 9/24* (2013.01); *A01G 9/20* (2013.01)

(58) Field of Classification Search
CPC . A01G 7/02; A01G 7/04; A01G 7/045; A01G 9/14; A01G 9/1438; A01G 9/18; A01G 9/20; A01G 9/24; A01G 9/246; A01G 9/26
USPC ............................................................ 47/17
See application file for complete search history.

(56) References Cited

U.S. PATENT DOCUMENTS

| | | | | |
|---|---|---|---|---|
| 3,322,946 A | * | 5/1967 | Cooper .................... | F21V 7/22 359/359 |
| 3,892,660 A | * | 7/1975 | Romell ............... | C05F 17/0063 210/603 |
| 4,198,953 A | * | 4/1980 | Power .................... | A01G 9/243 126/617 |
| 4,651,259 A | * | 3/1987 | Wendel .................... | F21V 9/40 362/2 |
| 4,662,106 A | * | 5/1987 | Mori ...................... | A01G 7/045 47/17 |
| 5,713,154 A | | 2/1998 | Goldstein et al. | |
| 6,314,675 B1 | * | 11/2001 | Costa .................... | A01G 31/06 47/17 |
| 8,894,478 B1 | * | 11/2014 | Stillwagon ............ | F24F 3/1603 454/231 |

(Continued)

FOREIGN PATENT DOCUMENTS

| | | |
|---|---|---|
| AU | 2006202086 | 5/2006 |
| DE | 2515363 A1 | 10/1976 |

*Primary Examiner* — Lisa L Tsang
(74) *Attorney, Agent, or Firm* — Muncy, Geissler, Olds & Lowe, P.C.

(57) ABSTRACT

The present invention relates to improvements in the environment controlled multi span structured greenhouses equipped with the modules AL, A1, A2, A3, A4, A5, A6, A7 plurality of sensors AL comprises a facility which magnifies and intensifies the artificial light and or natural light to the optimal level A1 comprises a capture manifold two blowers, a compressor tanks T1, T2 and a release manifold. A4 continuously harnesses bio-thermal energy A6 uses activated nutrients solutions of raw calcium sulphate, raw magnesium sulphate and urea substantially reducing input cost A7 comprises a thermal shading film fixed to the greenhouse rood and to the four external sides.

5 Claims, 4 Drawing Sheets

(56) References Cited

U.S. PATENT DOCUMENTS

| | | | |
|---|---|---|---|
| 2004/0244283 A1* | 12/2004 | Chen | A01G 9/00 47/17 |
| 2011/0041395 A1 | 2/2011 | Newbold et al. | |
| 2011/0143646 A1* | 6/2011 | Van Der Kooij | A01G 9/241 454/237 |
| 2012/0210637 A1* | 8/2012 | Kamahara | A01G 7/045 47/17 |
| 2015/0237812 A1* | 8/2015 | Gupta | A01G 9/14 47/17 |
| 2015/0319933 A1* | 11/2015 | Li | A01G 22/00 47/58.1 LS |

* cited by examiner

MODULE A1 AND MODULE A2

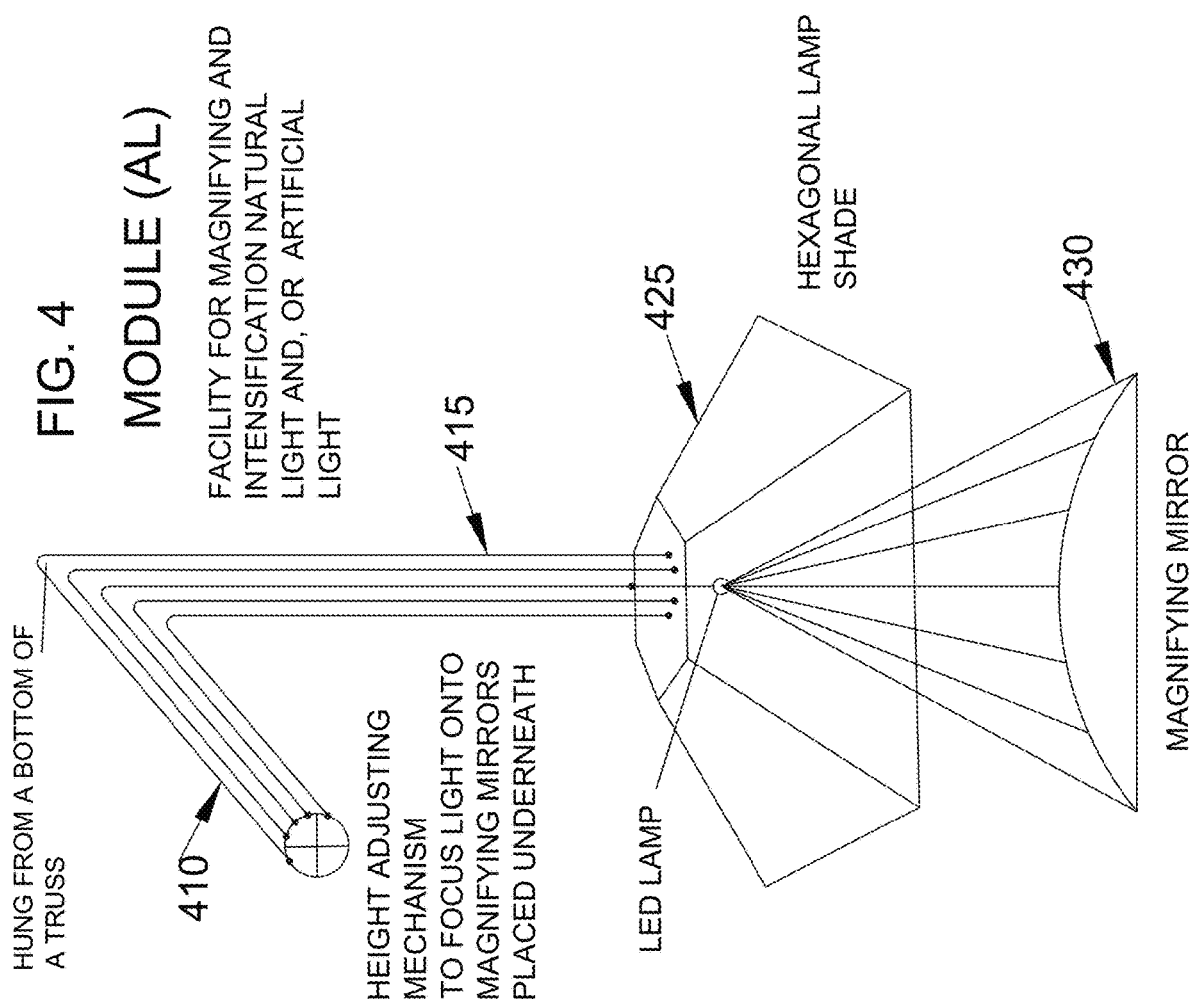

ENVIRONMENT-CONTROLLED GREENHOUSE WITH COMPRESSOR AND BLOWER MODULES

FIELD OF THE INVENTION

The present invention relates to the environment controlled multi span structured L 1 capital and operating cost greenhouses for L 1 cost food production.

BACKGROUND OF THE INVENTION

The present invention relates to further improvements to the PCT/IN2012/000830 application filed on 19 Dec. 2012 and European Patent Application No. 18183612.2 filed on Jul. 16, 2018 and entitled: Environment Control Multi Span Structured Greenhouse, by the same inventor—Sat Parkash Gupta, wherein the European Patent Office has issued a Notice of Allowance, V0650002EP as of May 28, 2020.

Although previous invention PCT/IN2012/000830 provides innovative tangible solutions of almost all the problems of the prior art greenhouses for cost effective food production, however during the last over five years the same inventor has realized that there is still scope for further reduction in a cost of food production by further reducing the capital and operating costs of greenhouses.

In the previous invention disclosed in CIPO Patent Application No. 2883489, a compressor was used for the following four functions:
(i) the compressor functions with the capture manifold for capturing and compressing a carbon dioxide rich greenhouse air during dark hours and an oxygen rich greenhouse air during light hours;
(ii) the compressor functions with the release manifold for releasing into the greenhouse at a level of cultivation of crop, carbon dioxide rich greenhouse air during light hours and an oxygen rich greenhouse air during dark hours;
(iii) the compressor functions for injecting pressurized oxygen rich greenhouse air of a predetermined temperature into a root zone of a crop; and
(iv) the compressor functions for supplying pressurized oxygen rich greenhouse air to the biothermal energy harnessing tank for harnessing bio thermal energy.

It is an object of the present invention to provide improvements over and above the greenhouses of the prior art.

The present application uses the compressor only for adjusting air relative humidity of a greenhouse at a predetermined set point or to adjust greenhouse air temperature at a predetermined set point which comprises capturing, compressing greenhouse humid air maintaining the compressed greenhouse humid air at lowest humidity (almost dry) in the dehumidifying tanks (T1) and (T2) and storing into a third compartment (Ecd) and into a fourth compartment (Eod) of the earth tube heat exchanger respectively.

The present application comprises a capture blower, a release blower, a blower for injecting pressurized oxygen rich greenhouse air of a predetermined temperature into the crop root zone, and a blower for injecting pressurized oxygen rich greenhouse air into biothermal energy harnessing tank of a module (A4) and functions with the compressor, the capture manifold, two dehumidifying tanks T1 and T2, the release manifold of the module (A 1), the earth tube heat exchanger of the module and hot air storage tank and carbon dioxide storage tanks of the module (A4)

The compressor functions with the capture manifold to capture and compress carbon dioxide rich greenhouse humid air during dark hours and oxygen rich greenhouse humid air during light hours. The dehumidifying tanks (T1) and (T2) are alternately filled up with compressed carbon dioxide rich greenhouse humid air during dark hours and with compressed oxygen rich greenhouse humid air during light hours for maintaining the filed up compressed humid air at lowest humidity (almost dry) in the dehumidifying tanks (T1) and (T2) for maintaining the carbon dioxide rich greenhouse air at lowest humidity (almost dry) is stored into a third compartment (Ecd) and the oxygen rich lowest humidity (almost dry) greenhouse air is stored into a fourth compartment (Eod) of the earth tube heat exchanger.

The capture blower functions with the capture manifold, to capture a carbon dioxide rich greenhouse air during dark hours and an oxygen rich greenhouse air during light hours which are directly stored into a first (Ee) and a second (Eo) compartment of the earth tube heat exchanger.

The release blower functions with the release manifold for releasing into the greenhouse at a level of cultivation, carbon dioxide rich lowest humidity (almost dry) conditioned greenhouse air already stored in a third compartment (Ecd) during light hours and oxygen rich lowest humidity (almost dry) conditioned greenhouse air already stored in a fourth compartment (Eod) during dark hours for mixing with the greenhouse humid air for maintaining the greenhouse air relative humidity at a predetermined set point or for maintaining greenhouse air temperature at a predetermined set point.

The release blower further functions with the release manifold for also releasing into the greenhouse at a level of cultivation, carbon dioxide rich conditioned greenhouse air already stored in a first compartment (Ee) during light hours and an oxygen rich conditioned greenhouse air already stored in a second compartment (Eo) during dark hours.

In a first aspect of the present invention, there is provided an environment-controlled, multi span structured greenhouse comprises a roof and four sides.

In a second aspect of the present invention, the greenhouse comprises a module (AL) comprising a facility which intensifies and magnifies the natural light and/or artificial light to the predetermined level producing red blue and ultraviolet light in suitable proportions.

In a third aspect of the present invention, the greenhouse comprises a module (A 1) comprising two blowers a capture blower and a release blower, each of a suitable pressure and of a suitable cubic meters per hour delivery, a compressor of a defined pressure and of a suitable cubic meters per hour delivery a capture manifold, two dehumidifying tanks T1 and, T2 and a release manifold wherein the capture blower functions with the capture manifold for capturing a carbon dioxide rich greenhouse air during dark hours and an oxygen rich greenhouse air during light hours which are directly stored into a first compartment (Ee) and into a second compartment (Eo) of the earth tube heat exchanger respectively In a fourth aspect of the present invention, the greenhouse comprises a module (A2) comprising a blower of a suitable pressure and of a suitable cubic meters per hour delivery; for injecting pressurized oxygen rich greenhouse air of a predetermined temperature into the crop root zone during an irrigation and a fertigation event. for aeration of the roots of the crop and for maintaining the temperature of the roots of the crop at a suitable temperature point.

In a fifth aspect of the present invention, the greenhouse comprises a module A4 comprising a bio-thermal energy harnessing automated equipment comprising a single biothermal energy harnessing tank, equipped with a facility for partially loading fresh material from top end and unloading compost from bottom end at suitable intervals comprising a separate blower, a separate water pump and a separate water tank, In a sixth aspect of the present invention, cost of nutrients is further reduced by using calcium sulphate magnesium sulphate, and urea, using a method for dissolving calcium sulphate and raw magnesium sulphate into water and converting urea into nitrate.

In a seventh aspect of the present invention, the greenhouse comprises a module (A7) comprising fixing thermal shading film of suitable thickness based upon the climate of the location to the greenhouse roof and to the four exterior sides of the greenhouse and being configured to prevent ingress of pathogens, disease organisms, insect pests and the like into the greenhouse, facilitating efficient biological control.

In an eighth aspect of the present invention, in geographical locations where the climate is suitably moderate, the greenhouse comprises a module A71 comprising a thermal shading film of a defined thickness based upon the climate of the location fixed to the roof of the greenhouse and to at least one of the four sides of the greenhouse wherein the sides of the greenhouse that do not have the thermal shading film fixed thereto, comprise fixing a diffused white film to the external surface thereof together with an automated 0-100% roll-on (close) and roll-off (open) thermal shading curtain covering the internal surfaces thereof.

In accordance with an aspect of the present invention, there is provided an environment-controlled, multi span structured greenhouse having a roof and four sides, the greenhouse comprising:

a module (A 1) comprising a compressor, a capture blower, a release blower, a capture manifold, two dehumidifying tanks (T1) and (T2), a release manifold, and an earth tube heat exchanger, wherein:

(i) the compressor functions with the capture manifold to capture a carbon dioxide rich humid air from the greenhouse during dark hours to provide a captured carbon dioxide rich humid air and to capture an oxygen rich humid air from the greenhouse during light hours to provide a captured oxygen rich humid air, the compressor compresses the captured carbon dioxide rich humid air to provide a compressed carbon dioxide rich humid air and compresses the captured oxygen rich humid air to provide a compressed oxygen rich humid air, the dehumidifying tanks (T1) and (T2) dehumidify the compressed carbon dioxide rich humid air to provide a carbon dioxide rich lowest humidity air and dehumidify the compressed oxygen rich humid air to provide an oxygen rich lowest humidity air, and the carbon dioxide rich lowest humidity air is stored into a third compartment (Ecd) of the earth tube heat exchanger to provide a stored carbon dioxide rich lowest humidity conditioned air and the oxygen rich lowest humidity air is stored in a fourth compartment (Eod) of the earth tube heat exchanger to provide a stored oxygen rich lowest humidity conditioned air;

(ii) the capture blower functions with the capture manifold to capture a carbon dioxide rich greenhouse air from the greenhouse during the dark hours to provide a captured carbon dioxide rich greenhouse air and to capture an oxygen rich greenhouse air from the greenhouse during the light hours to provide a captured oxygen rich greenhouse air, wherein the captured carbon dioxide rich greenhouse air is stored in a first compartment (Ee) of the earth tube heat exchanger to provide a stored carbon dioxide rich conditioned air and the captured oxygen rich air is stored in a second compartment (Eo) of the earth tube heat exchanger to provide a stored oxygen rich conditioned air; and (iii) the release blower functions with the release manifold to release into the greenhouse at a level of cultivation of a crop during the light hours, the stored carbon dioxide rich lowest humidity conditioned air and to release into the greenhouse, at the level of cultivation during the dark hours, the stored oxygen rich lowest humidity conditioned air, for mixing with the greenhouse humid air to adjust a relative humidity of the greenhouse air to a predetermined relative humidity set point or to adjust a temperature of the greenhouse air to a predetermined temperature set point by evaporative cooling, and wherein: the release blower also functions with the release manifold to release into the greenhouse at the level of cultivation during the light hours, the stored carbon dioxide rich conditioned greenhouse air and to release into the greenhouse during the dark hours, the stored oxygen rich conditioned greenhouse air.

In an embodiment of the present invention, the environment-controlled, multi span structured greenhouse further comprises a module (A2) comprising a blower for injecting into a root zone of the crop, a pressurized oxygen rich greenhouse air of a predetermined temperature during an irrigation and a fertigation event for:

(i) aerating the roots of the crop; and
(ii) maintaining a temperature of the roots of the crop at the predetermined temperature set point.

In an embodiment of the present invention, the environment-controlled, multi span structured greenhouse further comprises a module (A4) comprising a biothermal energy harnessing tank having a top end and a bottom end, the biothermal energy harnessing tank comprising an inlet at the top end for partially loading a fresh material into the biothermal energy harnessing tank and an outlet at the bottom end for partially unloading of compost from the biothermal energy harnessing tank, wherein the biothermal energy harnessing tank further comprises a blower, a water pump and a water tank.

In an embodiment of the present invention, the environment-controlled, multi span structured greenhouse further comprises a module (A6) for converting urea into an activated solution of nitrate, for dissolving calcium sulphate in water to prepare an activated solution of calcium sulphate and for dissolving magnesium sulphate in water to prepare an activated solution of magnesium sulphate.

In an embodiment of the present invention, the environment-controlled, multi span structured greenhouse further comprises a thermal shading film fixed to the exterior surface of the roof and each of the four sides of the greenhouse, In an embodiment of the present invention, the environment-controlled, multi span structured greenhouse further comprises a thermal shading film fixed to the external surface of the roof and at least one of the four sides of the greenhouse, wherein each side of the greenhouse that does not comprise the thermal shading film fixed thereto, comprises a milky white film fixed to the external surface thereof together with an automated retractable thermal shading curtain covering the internal surface thereof.

In an embodiment of the present invention, the environment-controlled, multi span structured greenhouse further comprises light-emitting diode (LED) lamps for producing artificial light and magnifying mirrors and aluminum foil for magnifying and intensifying natural and/or artificial light to produce red, blue, and ultraviolet light, wherein:

i) the LED lamps are mounted in red, d blue and ultraviolet-colored hexagon-shaped mirrored shades and are hung staggered from a bottom of a truss of the greenhouse at a predetermined locations along the truss;

ii) the magnifying mirrors are colored red, blue and ultraviolet;

iii) a predetermined portion of the magnifying mirrors are mounted in a fixture for tilting at any angle up to 180 degrees in the vertical plane and at any angle up to 360 degrees in the horizontal plane;

iv) another predetermined portion of the magnifying mirrors are mounted on the vertical and horizontal supports of the greenhouse and on the internal surfaces of the sides of the greenhouse for tilting at a predetermined angle in the vertical plane and/or the horizontal plane;

v) the aluminum foil is fixed on the internal surfaces of the sides of the greenhouse; and vi) when the artificial light from the LED lamps and/or the natural light from the sunstrikes the surfaces of a portion of the magnifying mirrors, a portion of the lampshades and a portion of the aluminum foil, the artificial and/or natural light is reflected repeatedly to the surfaces of another portion of the magnifying mirrors, another portion of the lamp shades and another portion of the aluminum foil and is magnified and intensified, producing red, blue and ultraviolet light.

These and other aspects of the present invention and further advantages of the present invention will become apparent to those skilled in the art upon reading the following detailed description of the embodiments described herein in conjunction with the associated drawings illustrated herein.

BRIEF DESCRIPTION OF THE DRAWINGS

Features and advantages of embodiments will become apparent from the following detailed description, taken in combination with the appended drawings in which:

FIG. 3 depicts module A6 and.
FIG. 4 depicts modules AL

REFERENCE NUMERALS IN THE DRAWINGS

Figure 1:
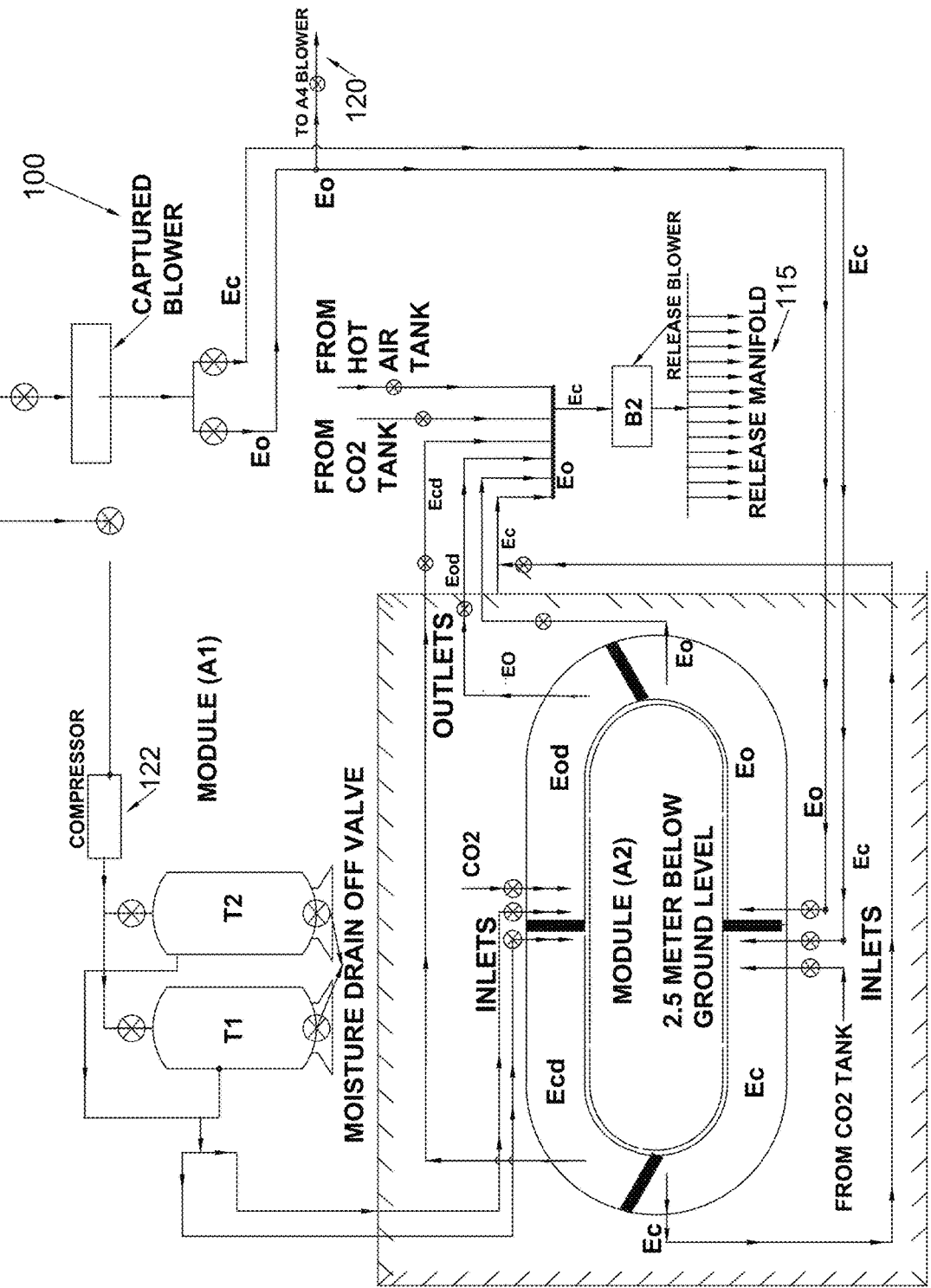
FIG. 1 depicts modules A 1 and A2.
Figure 2:
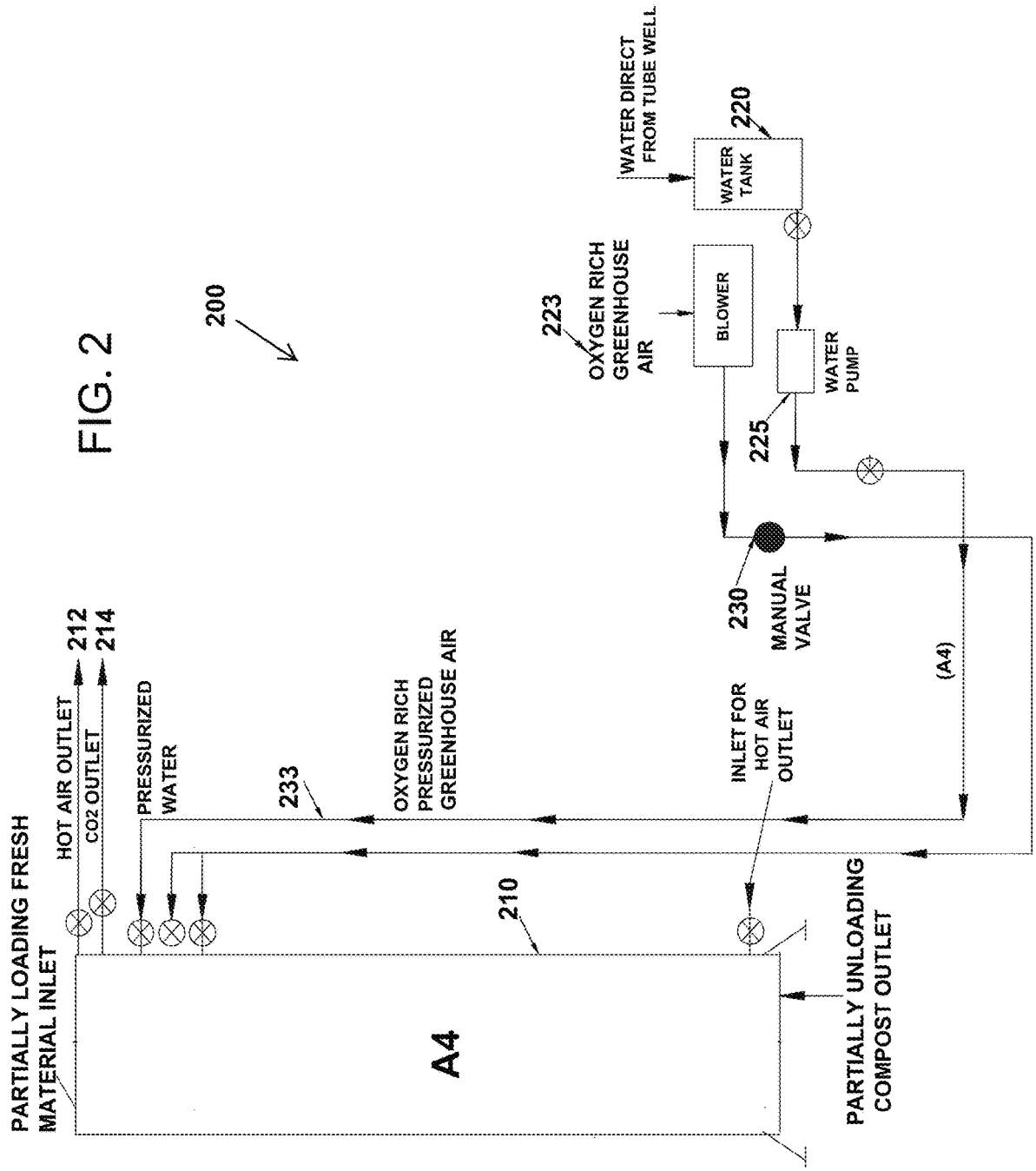
FIG. 2 depicts module A4.
Figure 3:
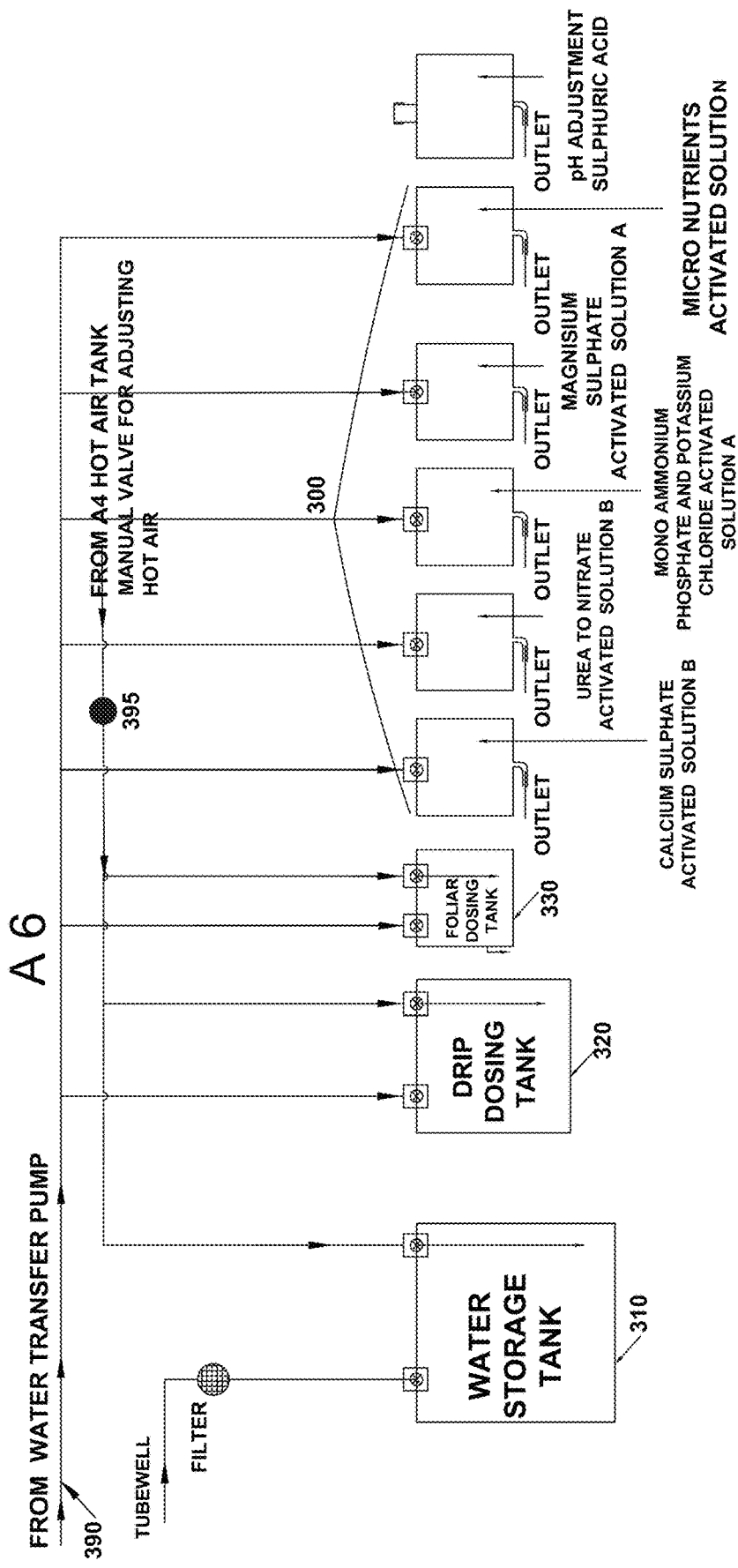

A 1 module 1 with tanks T1 and T2;
A2 module 2 with C02 tanks;
A6 an assembly of tanks and systems;
A7 greenhouse structure;
AL assembly or module for light for intensification and magnification;
(Ee) first earth tube heat exchange compartment; 25
(Eo) a second earth tube heat exchange compartment;
(Ecd) a third earth tube heat exchange compartment;
(Eod) a fourth earth tube heat exchange compartment;
T1 tank 1;
T2 tank 2;
100 modules (A1) and (A2) in general;
110 capture manifold;
115 release manifold;
120 line to (A4) blowers;
122 compressor;
123 blower for injecting oxygen rich air into crop root zone
124 Solenoid valves
200 module (A4) in general;
210 tank of (A4);
212 hot air outlet;
214 C02 outlet;
220 water tank of (A4);
223 blower of (A4);
225 water pump of (A4); 5
20 230 manual valve;
233 pressurized water line;
300 tanks for chemical transformation;
310 water storage tank;
320 drip dosing tank; 1 O
330 Foliar dosing tank;
390 line from water transfer pump;
395 line from A4 hot air tank
410 truss connection level;
415 height adjustment mechanism; 15
425 hexagonal lamp shade;
430 magnification mirror;

Similar references are used in different figures to denote similar components.

DETAILED DESCRIPTION OF THE INVENTION

According to a first embodiment of the present invention, there is provided an environment-controlled multi span structured greenhouse comprising a roof and four sides.

According to a second embodiment of the present invention, the greenhouse comprises a module (AL), comprising a facility which intensifies and magnifies the natural light and/or artificial light to a predetermined level producing red blue and white light in predetermined proportions, wherein:

(i) the artificial light comprises light emitting diode lamps emitting predetermined lumens with hexagon shaped mirrored shades of a predetermined size in red, blue and white coloring in predetermined proportions wherein the lamps with shades are hung from a bottom of a truss at predetermined square meters centers and are provided the facility of being raised as the plants grow in height;

(ii) the magnifying mirrors comprised of a predetermined diameter and of a predetermined radius in red, blue and white coloring in predetermined proportions with a mounting fixture for titling at any angle up to 180° in the vertical plane and at any angle up to 360° in the horizontal plane; and (iii) aluminum foil fixed to surfaces of the greenhouse internal sides, the artificial lighting and/or sun light striking some of the mirrors, lamp shades and aluminum foil is reflected repeatedly to the surfaces of other mirrors, lamp shades and aluminum foil and is intensified and magnified to the predetermined set point, producing red, blue and white light in predetermined proportions.

In a third embodiment of the present invention, the greenhouse comprises a module (A 1) comprising a capture blower and a release blower which functions with the compressor, the capture manifold, the dehumidifying tanks T1 and T2 and the release manifold of the module (Z1) and earth tube heat exchanger comprising four compartments of the module (Z2) wherein:

(i) the compressor functions with the capture manifold to capture and compressed a carbon dioxide rich greenhouse humid air during dark hours and an oxygen rich greenhouse humid air during light hours which is dehumidified in the tanks (T1) and (T2) and stored into a respective a third and a fourth compartments (Ecd) and (Eod) of an earth tube heat exchanger;

(ii) the capture blower functions with the capture manifold to capture a carbon dioxide rich greenhouse air during dark hours and an oxygen rich greenhouse air during the light hours which is directly stored into a first compartment (Ee) and into a second compartment (Eo) of the earth tube heat exchanger;

(iii) the release blower functions with the release manifold to release into the greenhouse at a level of cultivation a carbon dioxide rich dehumidified conditioned greenhouse air already stored into a third compartment (Ecd) during light hours and an oxygen rich dehumidified conditioned greenhouse air already stored into a fourth compartment (Eod) during dark hours for mixing with the greenhouse existing humid air for adjusting the greenhouse air relative humidity predetermined relative humidity set point or for adjusting the greenhouse air temperature predetermined temperature set point in the hot locations by efficient evaporative cooling; and (iv) the release blower functions with the release manifold to also release into the greenhouse at a level of cultivation carbon dioxide rich conditioned greenhouse air already stored in a first compartment (Ee) during light hours and an oxygen rich conditioned greenhouse air already stored in a second compartment (Eo) during dark hours.

In a fourth embodiment of the present invention, the greenhouse comprises a module (A2) comprising a blower for injecting during an irrigation and during a fertigation event pressurized oxygen rich greenhouse air of predetermined temperature into the root zone of a crop for:

a) aeration of the root zone of the crop; and b) maintaining the temperature of the root zone of the crop at predetermined temperature set point which facilitates optimal uptake of nutrient leading to maximize the productivity.

In a fifth embodiment of the present invention, the greenhouse comprises a module (A4) comprising a biothermal energy harnessing automated equipment which functions with the hot air storage tank and a carbon dioxide storage tank of the module (Z4) and comprises a single biothermal energy harnessing tank, having an inlet at the top end for partially loading a fresh material into the biothermal energy harnessing tank and an outlet at the bottom end for partially unloading compost from a bottom end of the biothermal energy harnessing tank, at predetermined intervals, wherein biothermal energy harnessing tank comprises a blower, a water pump and a water tank.

In a sixth embodiment of the present invention, the greenhouse comprises a module (A6) which reduces the cost of nutrients by using activated solutions of raw calcium sulphate (gypsum), of raw magnesium sulphate, and of urea, using a method for dissolving into water and activating raw calcium sulphate and raw magnesium sulphate solutions and converting urea into an activated solution of nitrate [using a catalyst and stirring the solution 100 rpm clockwise and 100 rpm counterclockwise alternately for about 10 minutes.

In a seventh embodiment of the present invention, the greenhouse comprises a module (A7) comprising fixing a thermal shading film of predetermined thickness to the greenhouse roof and to the four external sides of the greenhouse.

In an eighth embodiment of the present invention, in the geographical locations wherein the climate is relatively moderate, the greenhouse comprises a module (A7) which further comprises fixing a thermal shading film of predetermined thickness to the roof of the greenhouse and to at least one external side of the greenhouse and fixing a milky white film to the sides without thermal shading film together with an automated retractable thermal shading curtains covering the internal surface thereof.

It is understood that the terminology used herein is for the purpose of describing particular embodiments/aspects only, and is not intended to be limiting. Patent applications, patents, and/or publications are cited herein to assist in understanding the aspects described. All such references cited herein are incorporated herein by reference in their entirety and for all purposes to the same extent as if each individual publication or patent or patent application was specifically, and individually indicated to be incorporated by reference in its entirety for all purposes. To the extent publications and patents or patent applications incorporated by reference contradict the disclosure contained in the specification, the specification is intended to supersede and/or take precedence over any such contradictory material.

In understanding the scope of the present application, the articles "a", "an", "the", and "said" are intended to mean that there are one or more of the elements. Additionally, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives.

It will be understood that any aspects described as "comprising" certain components may also "consist of" or "consist essentially of," wherein "consisting of" has a closed-ended or restrictive meaning and "consisting essentially of" means including the components specified but excluding other components except for materials present as impurities, unavoidable materials present as a result of processes used to provide the components, and components added for a purpose other than achieving the technical effect of the invention. "Connected," "coupled," or any variant thereof means any connection or coupling, either direct or indirect, between two or more elements; the coupling or connection between the elements can be physical, logical, or a combination thereof. "Herein," "above," "below," and words of similar import, when used to describe this specification shall refer to this specification as a whole and not to any particular portions of this specification.

It will be understood that any component defined herein as being included may be explicitly excluded from the claimed invention by way of proviso or negative limitation.

The above description is to understand the present invention and in no way to limit the scope of the present invention which is amendable to various modifications and improvements within the scope of the present invention which will be evident to those skilled in the art. For example, the present invention is not restricted to only greenhouse applications.

Although certain embodiments have been described with reference to the figures, those of skill in the art will appreciate that variations and modifications may be made without departing from the scope thereof as defined by the appended claims.

What is claimed is:

1. An environment-controlled, multi span structured greenhouse having a roof and four sides, the greenhouse further comprises:
   a module comprising:
     a capture manifold,
     a compressor that functions with the capture manifold to capture a carbon dioxide rich humid air from the greenhouse during dark hours and to capture an oxygen rich humid air from the greenhouse during light hours, a capture blower, a release blower, two dehumidifying tanks, a biothermal energy harnessing automated module comprising a single biothermal energy harnessing tank provided with an inlet at a top end for partially loading a fresh material into the biothermal energy harnessing tank and an outlet at a bottom end for partially unloading compost from the biothermal energy harnessing tank, wherein the biothermal energy harnessing tank further comprises a blower, a water pump, and a water tank, a release manifold, and an earth tube heat exchanger comprising:
   a first compartment that stores captured carbon dioxide rich greenhouse air,
   a second compartment that stores captured oxygen rich greenhouse air;
   a third compartment to store a carbon dioxide rich almost dry greenhouse air;
   a fourth compartment to store oxygen rich almost dry greenhouse air, wherein:
(i) the compressor compresses the captured carbon dioxide rich greenhouse humid air to form a compressed carbon dioxide rich humid air and compresses the captured oxygen rich humid air to form a compressed oxygen rich humid air, the two dehumidifying tanks dehumidify the compressed carbon dioxide rich humid air to form the carbon dioxide rich almost dry greenhouse air and dehumidify the compressed oxygen rich humid air to form the oxygen rich almost dry greenhouse air, the carbon dioxide rich almost dry greenhouse air is stored into a third compartment and the oxygen rich almost dry greenhouse air is stored into a fourth compartment of the earth tube heat exchanger;
(ii) the capture blower functions with the capture manifold to capture the carbon dioxide rich greenhouse air from the greenhouse during the dark hours, and to capture the oxygen rich greenhouse air from the greenhouse during the light hours;
(iii) the release blower functions with the release manifold to release into the greenhouse at a level of cultivation of a crop, during the light hours, stored carbon dioxide rich almost dry conditioned greenhouse air and to release into the greenhouse at the level of cultivation, during the dark hours, stored oxygen rich almost dry conditioned greenhouse air, for mixing with greenhouse humid air to adjust a relative humidity of the greenhouse air to a defined relative humidity set point or to adjust a temperature of the greenhouse air to a defined temperature set point, in hot locations, and wherein:
   the release blower functions with the release manifold to release into the greenhouse at the level of cultivation during the light hours, stored carbon dioxide rich conditioned greenhouse and to release into the greenhouse during the dark hours, stored oxygen rich conditioned greenhouse air, and the greenhouse further comprises light-emitting diode (LED) lamps for producing artificial light and magnifying mirrors, and aluminum foil for magnifying and intensifying natural and/or artificial light to produce red, blue, and ultraviolet light, wherein:
      i) the LED lamps are mounted in red, blue, and ultraviolet-colored hexagon-shaped shades and are hung staggered from a bottom of a truss of the greenhouse at defined square meters centers, the LED lamps comprise a facility of being raised as plants grow in height, and are focused to throw light on the magnifying mirrors mounted in a fixture placed underneath at a provided flat surface for tilting the magnifying mirrors at any angle up to 180 degrees in a vertical plane and at any angle up to 360 degrees in a horizontal plane;
      ii) the magnifying mirrors are colored red, blue, and ultraviolet;
      iii) the aluminum foil is fixed hanging on the greenhouse sides comprising a thermal shading film, and also fixed hanging from existing vertical and horizontal supports; and wherein:
      iv) when natural and/or artificial light strikes the magnifying mirrors, mirrored lamp shades and aluminum foil, the natural and/or artificial light is reflected repeatedly to surfaces of other magnifying mirrors, lamp shades, and aluminum foil and is intensified and magnified to a defined optimal level, producing red, blue, and ultraviolet light in a defined proportions.

2. The environment-controlled, multi span structured greenhouse of claim 1, further comprising a module comprising a defined pressure and a defined cubic meters per hour delivery for injecting into a root zone of a crop, a pressurized oxygen rich greenhouse air of a defined temperature during an irrigation, and a fertigation event and also at defined intervals and durations for:
   (i) aerating the roots of the crop; and
   (ii) maintaining a temperature of the roots of the crop at a defined temperature set point.

3. The environment-controlled, multi span structured greenhouse of claim 1, further comprises a module comprising activated solutions of a raw calcium sulphate (gypsum), a raw magnesium sulphate and urea by, dissolving the raw calcium sulphate and the raw magnesium sulphate in water and converting urea into a nitrate.

4. The environment-controlled, multi span structured greenhouse of claim 1, further comprises the thermal shading film of a defined thickness, based upon a climate of a location, fixed to the roof of the greenhouse and to the four sides of the greenhouse, wherein interior and exterior surfaces of the thermal shading film function as solid barriers between the greenhouse air temperature and air relative humidity environment, and an atmosphere air temperature and air relative humidity environment wherein the interior surfaces absorb and retain a warm or cool greenhouse air trying to escape into the atmosphere, and the exterior surfaces absorb and retain hot or cold atmospheric air trying to enter into the greenhouse.

5. The environment-controlled, multi span structured greenhouse of claim 1, in a locations wherein a climate is moderate, the greenhouse further comprising the thermal shading film of a defined thickness fixed to the roof of the greenhouse and to the sides, and wherein the side or the sides without thermal shading film, affixed thereto, comprises a light diffusing film fixed to the external surface thereof together with automated 0-100% roll-on (close) and roll-off (open) thermal shading internal curtains.

\* \* \* \* \*